United States Patent [19]
Priese et al.

[11] 4,132,071
[45] Jan. 2, 1979

[54] ELECTRO-HYDRAULIC CONTROLLED VALVE ACTUATOR SYSTEM

[75] Inventors: Werner K. Priese, Barrington; Charles I. Koehlert, Dundee, both of Ill.

[73] Assignee: Hills-McCanna Company, Carpentersville, Ill.

[21] Appl. No.: 840,602

[22] Filed: Oct. 11, 1977

[51] Int. Cl.² .................. F16D 31/00; F15B 15/18
[52] U.S. Cl. .................................... 60/328; 60/403; 60/903; 60/DIG. 2; 251/89
[58] Field of Search .......... 60/328, 390, 403, 406–433, 60/468, 494, 903, DIG. 2; 92/130 D; 251/70, 71, 89

[56] References Cited
U.S. PATENT DOCUMENTS

| | | | |
|---|---|---|---|
| 3,394,632 | 7/1968 | Priese | 92/68 |
| 3,430,916 | 3/1969 | Raymond | 251/71 |
| 3,687,415 | 8/1972 | Turkot | 251/89 |

*Primary Examiner*—Edgar W. Geoghegan
*Attorney, Agent, or Firm*—Olson, Trexler, Wolters, Bushnell & Fosse, Ltd.

[57] ABSTRACT

A hydraulic valve actuator includes at least one piston mounted for reciprocating movement in a cylinder for bidirectionally rotating a valve shaft mounted in the housing. A resilient spring member is held in compression between one side of the piston and an end wall of the cylinder for yieldably urging the piston to rotate the shaft in one direction, in the absence of a sufficient opposing hydraulic pressure. A hydraulic pump driven by an electric motor selectively drives the piston against the force of the spring member for rotating the valve shaft in the opposite direction. An electric solenoid operated valve is connected with the cylinder at either side of the piston, to provide a selectively openable path for hydraulic fluid, by-passing the pump to relieve the pressure applied thereby. Selectively operable mechanical or electronic switches are provided for energizing and deenergizing the solenoid valve and the hydraulic pump to cause the piston to move in the corresponding direction, to open or close the valve as desired. An electro-mechanical control system is connected with the valve shaft and the switches to actuate and maintain the valve in its fully opened, fully closed, or some desired intermediate condition. In one embodiment the electro-mechanical system includes a gear and cam arrangement driven by the valve shaft for actuating mechanical switches, and in another embodiment the system includes a potentiometer driven by the valve shaft and an electronic control system responsive thereto for actuating electronic switches.

12 Claims, 6 Drawing Figures

ELECTRO-HYDRAULIC CONTROLLED VALVE ACTUATOR SYSTEM

BACKGROUND OF THE INVENTION

This invention relates generally to hydraulic valve actuators, and more particularly to a hydraulic valve actuator and an electro-hydraulic system for controlling the operation thereof.

Various valve actuators of the pneumatic and hydraulic type are known in the art. One hydraulic valve actuator is described, for example, U.S. Pat. No. 3,394,632. However, in prior art pneumatic and hydraulic actuators, it has generally been necessary to provide an external source of pressurized hydraulic fluid or pressurized air, as the case may be, and connecting lines leading from the source to the actuator. Owing to space limitations in many installations, this external source must often be located remotely from the actuator and valve, with relatively long connecting lines provided therebetween. In many cases, the valve to be controlled is part of a system in which extremes of temperature are present. These temperatures may cause undesirable effects on the fluid or air in the connecting tubes, or even cause damage or rupture of the tubes themselves. Further, such systems generally are entirely manually operated, a mechanical indicator of valve position being mounted on the valve shaft, for example, while the valve controls are generally mounted in a location remote from the actuator and valve. In such prior art systems, therefore, it is often difficult for an operator to simultaneously monitor the valve position and operate the valve controls. Moreover, there is no provision in such systems for retaining the valve in a desired position, once such a position is established, and therefore, the valve and its condition must be frequently or even continuously monitored by an operator.

Another prior art valve control system utilizes an electric motor actuator connected with the valve shaft. But when relatively large valves are to be actuated, very large electric motors and corresponding high voltage power lines are required, thus adding appreciably to the expense of such a system with respect to the relatively simpler hydraulic systems of the above-cited patents. Such electric motor actuators are shown, for example, in U.S. Pat. Nos. 3,430,916 and 3,687,415.

It will be appreciated that an all-electric system may be readily adapted for use with modern types of electronic automatic control sytems, thus eliminating the problems of manual operation associated with the hydraulic actuators referred to above. Several such control systems are described, for example, in the following publications:

Bulletin E-262, Remote Indicator and Control of Actuator Travel, published by the Hills-McCanna Company; Bulletin E-261a, Modular Solid-State Servo Amplifier, published by the Hills-McCanna Company; Product Data sheet PDC-1, March 1976, Modular Solid-State Process Controller, published by the Hills-McCanna Company; Bulletin No. A-3B, Ramcon Rotary Motion Control, published by the Hills-McCanna Company.

Some electric motor type actuators cannot be provided with fail-safe operating mechanisms. Broadly speaking, fail-safe devices are connected to the actuator so as to return the valve to a predetermined position, generally either the fully opened or fully closed position, when power to the actuator is lost for any reason. In contrast, such a fail-safe system has been used with pneumatic valve actuators, and generally comprises a resiliently biased spring member adapted to return the actuator to the predetermined "fail-safe" position upon loss of pneumatic pressure, as the case may be. Such a system is illustrated, for example, in the above-cited Bulletin No. A-3B.

OBJECTS AND SUMMARY OF THE INVENTION

Accordingly, it is a general object of this invention to provide an electro-hydraulic controlled valve actuator system for selectively manually or automatically setting and maintaining the position of a valve shaft actuated thereby.

A more specific object of this invention is to provide a valve actuator system of the type described which is adapted to actuate a valve to a predetermined position, and to automatically return the valve to the predetermined position, following a temporary loss of electric power or other failure.

Another object of this invention is to provide a valve actuator system of the type described, further adapted to selectively vary the predetermined position to which the valve is to be actuated and to automatically maintain the valve position thus selected, following initial actuation.

Still another object of this invention is to provide a valve actuator system of the type described, further adapted to automatically set and maintain or vary the valve position as required to maintain a desired rate of flow through the valve, and to return the valve to that desired position following any malfunction, including electrical power failure, which tends to vary the position of the valve.

Briefly, and in accordance with the foregoing objects, an electro-hyraulic controlled valve actuator system according to this invention comprises an actuator member including piston means mounted for reciprocation within a cylinder, means connect said piston means for rotating a valve shaft. An hydraulic pump is joined with the cylinder for selectively pumping the hydraulic fluid in a predetermined direction between portions of the cylinder on opposite sides of the piston to drive the piston in a first direction thereby rotating the valve shaft in a first corresponding direction. A valve is connected for selectively by-passing the hydraulic pump, and resilient means yieldably bias the piston in a second direction opposite the first direction. Thus, when the valve is open, the hydraulic fluid flows therethrough allowing the resilient means to drive the piston in the second direction to rotate the valve shaft in a second corresponding direction. Control means selectively energize the valve and hydraulic pump for rotating the valve to a preselected position and maintaining said preselected position.

Other objects, features and advantages of this invention will be more readily appreciated upon consideration of the following detailed descriptions, together with the accompanying drawings, wherein like reference numerals are used throughout to designate like elements and components.

DETAILED DESCRIPTION OF THE ILLUSTRATED EMBODIMENT

Figure 1:
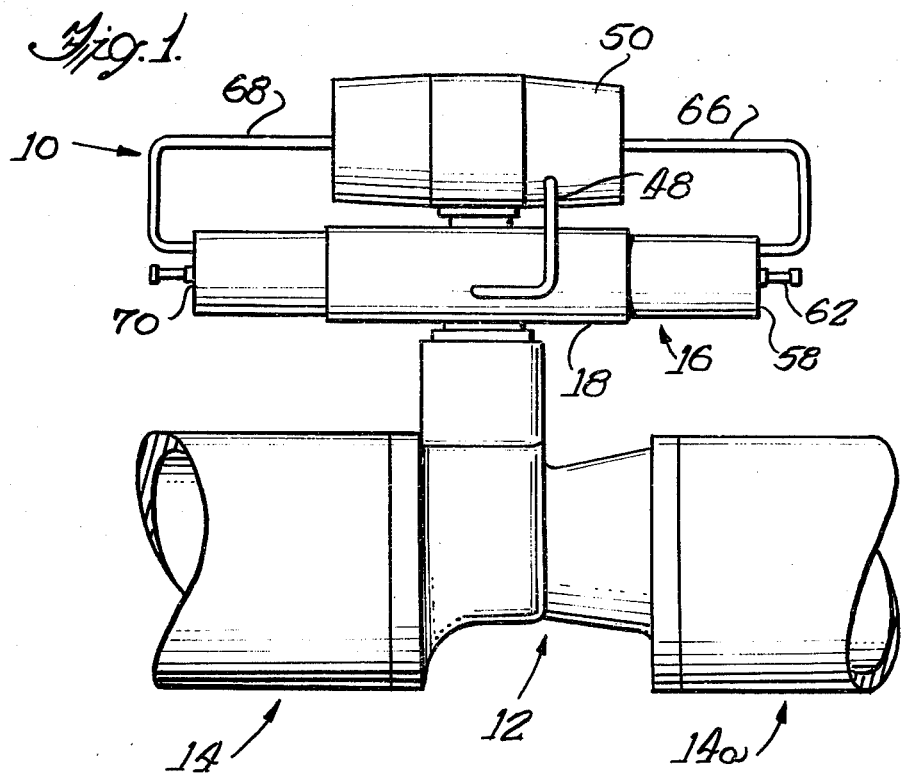
FIG. 1 is an elevational view of an electrohyraulic controlled valve actuator system according to this invention, in conjunction with a valve interposed in a fluid flow line.

Referring initially to FIG. 1, an electro-hydraulic controlled valve actuator system designated generally 10 is shown in conjunction with a valve 12 interposed between a pair of conduits 14, 14a through which it is desired to control the flow of fluid. Attention is first directed to a hydraulic actuator member designated generally 16, additional details of which are shown somewhat enlarged in a partially cut-away view in FIG. 2. The hydraulic actuator member 16, in accordance with this invention, comprises an elongate cylinder or housing 18, which defines a piston chamber 20. A pair of pistons 22 and 24 are mounted for reciprocating movement along the longitudinal axis of the housing 18 and chamber 20. The following description is directed to a preferred embodiment wherein the actuator member includes a pair of cooperating pistons. It will be understood, however, that this invention is applicable to an actuator member of the type described having a single reciprocating piston.

Figure 2:
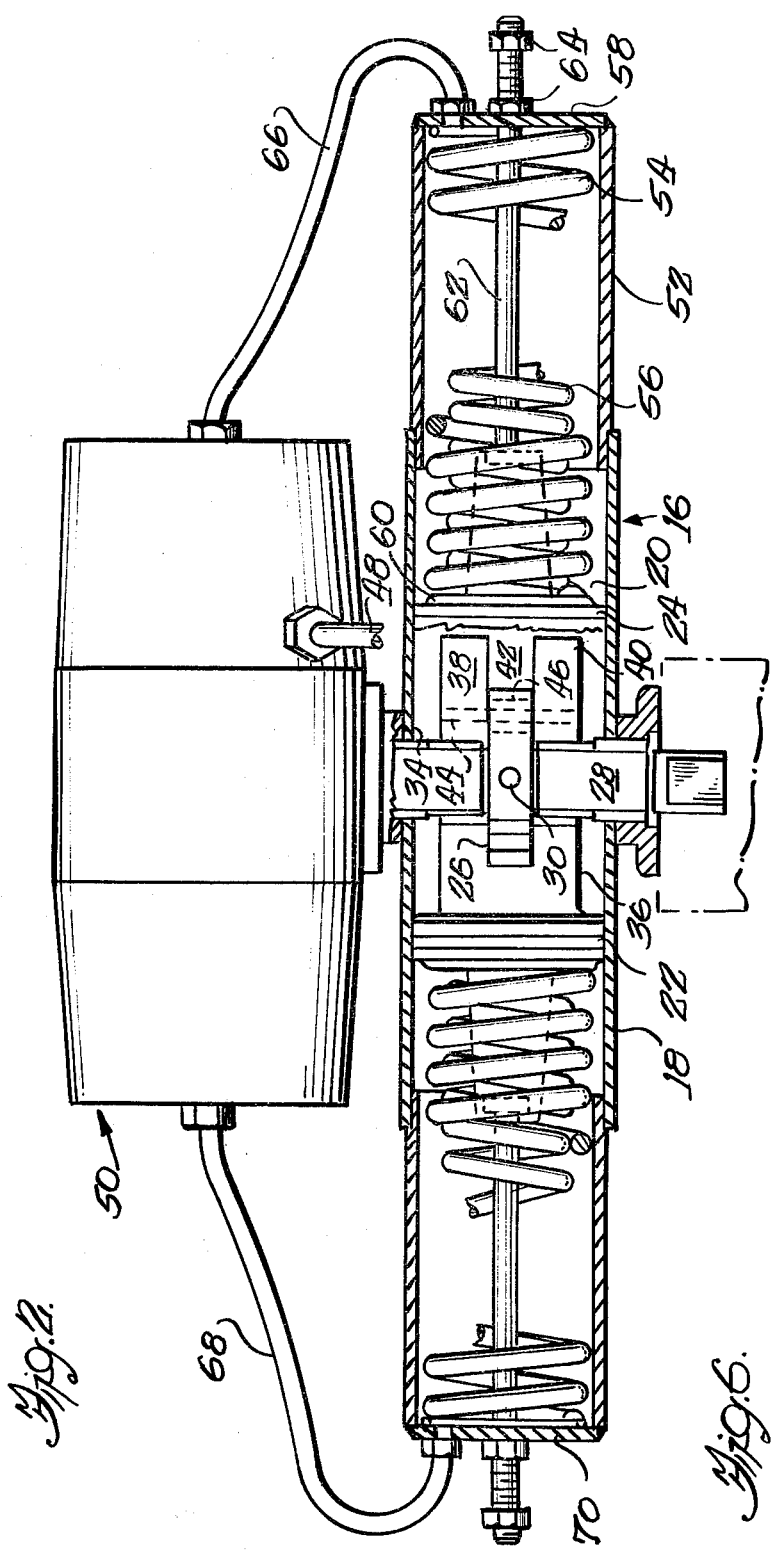
FIG. 2 is an enlarged elevational view, partially in section, illustrating additional detail of the actuator member of FIG. 1.

A yoke plate or lever 26 is secured to a control or drive shaft 28, which drives a cooperating shaft (not shown) of the valve 12, by suitable means such as a yoke pin 30, so that the center of the yoke plate or lever 26 coincides with an intersection between the longitudinal axis of the housing or cylinder 18 and the longitudinal axis of the control shaft 28. In the illustrated embodiment, the valve 12 preferably comprises a quarter-turn valve such as a ball or butterfly valve, which is operated, in a well known manner, by rotation of the valve ball or butterfly element in the valve chamber, via the valve shaft 28 attached thereto, to control the flow of fluid through the conduits 14 and 14a. It will be appreciated, however, that the present invention is also suitable for use with other types of valves, as for example diaphragm valves or the like which have other than a quarter-turn actuation characteristic. It will be understood, that while FIG. 2 illustrates a specific, preferred type of yoke arrangement for driving the control shaft 28, as detailed hereinafter, other types of arrangements may also be readily utilized. For example, gear trains and rack and pinion arrangements for this purpose are known to those skilled in the art.

The yoke plate or lever 26 and control shaft 28 are rotated relative to the housing 18 by reciprocating movement of the pistons 22 and 24, to operate the valve 12. This rotation of the control shaft is facilitated by a bearing 34 through which the shaft 28 or an extension thereof passes, in the upper portion of the housing 18.

More specifically, and with reference to FIG. 2, it will be seen that the pistons 22, 24 are capable of reciprocating motion both inwardly and outwardly with respect to the shaft 28 within the piston cylinder 20 defined by the housing 18. A head portion of each piston 22, 24 is generally cylindrical in shape and arranged to form a seal within the cylinder 18, to define chambers therein at either side of the piston, the volume of said chambers varying in accordance with the relative position of the pistons within the cylinder 20.

The piston 22 includes a longitudinally extending section 36 integrally formed therewith which extends inwardly towards the valve shaft 28 and yoke 26. To facilitate clarity in the illustration, a similar section of the piston 24 has been broken away, but it will be understood that the following description applies to the piston 24 as well. The section 36 includes a pair of longitudinally extending legs 38, 40 which are spaced apart to define an aperture or slot 42 in which a pin assembly 44 is mounted. The pin assembly 44 is fixedly mounted in the spaced apart legs 38 and 40, and a generally cylindrical roller member 46 is mounted coaxially upon the pin member 44 between the longitudinally extending legs 38 and 40. The roller 44 is thus positioned in rolling engagement with the side walls of a generally U-shaped slot (not shown) formed in the yoke plate or lever 26, whereby the yoke plate or lever 26 extends into the slot 42 formed between the legs 38 and 40 to engage the roller member 46.

In consequence of the above-described arrangement, the pistons 22 and 24 may be actuated or driven outwardly of their position shown in FIG. 2, whereby the legs 38, 40 and roller 44 rotate the yoke plate or lever 26 in a corresponding direction, which simultaneously rotates the valve shaft 28, thus tending to either open or close the valve, depending upon the relative position of the actuator member 16 with respect to the shaft 28 of the valve 12. More specifically in this regard, it will be appreciated that with the actuator mounted in a first orientation upon a quarter-turn valve such as the valve 12, that actuation of the pistons in a direction outwardly of the shaft 28 will rotate the shaft in a direction for closing the valve. Conversely, with the orientation of the actuator rotated by 90° with respect to the first orientation, the same actuation of the pistons will rotate the shaft 28 in a direction for opening the valve 12. In any case, the valve actuator 16 is advantageously arranged for hydraulic actuation of the pistons 22 and 24 by hydraulic fluid introduced to the chamber partly defined by the inner faces of the pistons 22, 24 about the shaft 28. Such introduction of hydraulic fluid is facilitated by a suitable fluid carrying conduit 48, connected through a side wall of the cylinder 18, and arranged for introducing hydraulic fluid thereto, as required by a control portion, designated generally 50, which forms a part of this invention, and will be more fully described hereinbelow.

The portion of the actuator member 16 thus far described corresponds substantially to the actuator described in U.S. Pat. No. 3,394,632. In accordance with the present invention, however, the actuator 16 includes additional elements and features, which will now be described more fully with reference to FIG. 2.

The actuator member 16, as mentioned above, is arranged for hydraulic operation, and further includes a provision for fail-safe operation. Briefly, by fail-safe operation is meant that the actuator member returns the valve shaft to a predetermined position upon loss of hydraulic power. In the illustrated embodiment, this fail-safe mechanism is identical with respect to both of the pistons 22 and 24, whereby only the mechanism associated with the piston 22 will be described in detail. An extension cylinder or housing 52 is joined by suitable means, including seals (not shown) to an outer end of the cylinder or housing 18. In the illustrated embodiment, a pair of generally concentric springs members 54 and 56 are held in compression between the outer wall 58 of the housing 52 and a plunger member 60 in contact with the piston 24. It will be understood that this pair of spring members 54 and 56 may be replaced, in some applications, by a single spring member, the foregoing being described only for purposes of illustrating a specific embodiment. The plunger 60, together with a guide shaft 62 attached to and extending outwardly through the end wall 58 of the cylinder 52, maintain the coaxial spring members 54 and 56 substantially in alignment with the longitudinal axis of the cylinder 52. It will be noted that the outer end of the shaft 62 is threaded to receive nuts 64 whereby the springs 54 and 56 are held in compression between the plunger 60 and wall 58, so as to define a limit of longitudinal expansion of the springs 54 and 56 just sufficient to drive the piston 24 to its innermost position with respect to the shaft 28, as illustrated in FIG. 2. In accordance with a feature of the invention, hydraulic fluid carrying conduits 66 and 68 are provided from the control system 50 to a suitable opening provided therefor through the side wall 58, and also through a similar side wall 70 associated with a similar fail-safe spring mechanism associated with the piston 22.

In operation, the control portion 50 is adapted, as will be more fully described hereinbelow, to receive hydraulic fluid from the reservoir formed by the cylinder 52, and a portion of the cylinder 20. When the pistons 22 and 24 are in the position illustrated in FIG. 2, the control system delivers said hydraulic fluid to the conduit 48 to be delivered to the portion of the cylinder 20 inwardly of the pistons 22 and 24, for driving the pistons outwardly to actuate the shaft 28. A return path, to be described below, is provided whereby hydraulic fluid may be returned via the conduit 48 and conduits 66 and 68 back to the corresponding reservoirs, thereby allowing the resilient compressed spring members to drive the pistons 22 and 24 back inwardly for actuating the shaft 28 in the opposite direction. It will be appreciated, then, that the cylinders 52 and 20 provide a variable volume fluid reservoir, a constant volume of hydraulic fluid being maintained in the actuator member at all times. The relative amounts of hydraulic fluid being retained at any time at opposite sides of the pistons 22 and 24 effectively determine the relative positions thereof within the cylinder 20 and therefor the relative position of the shaft 28 and valve 12.

Figure 4:
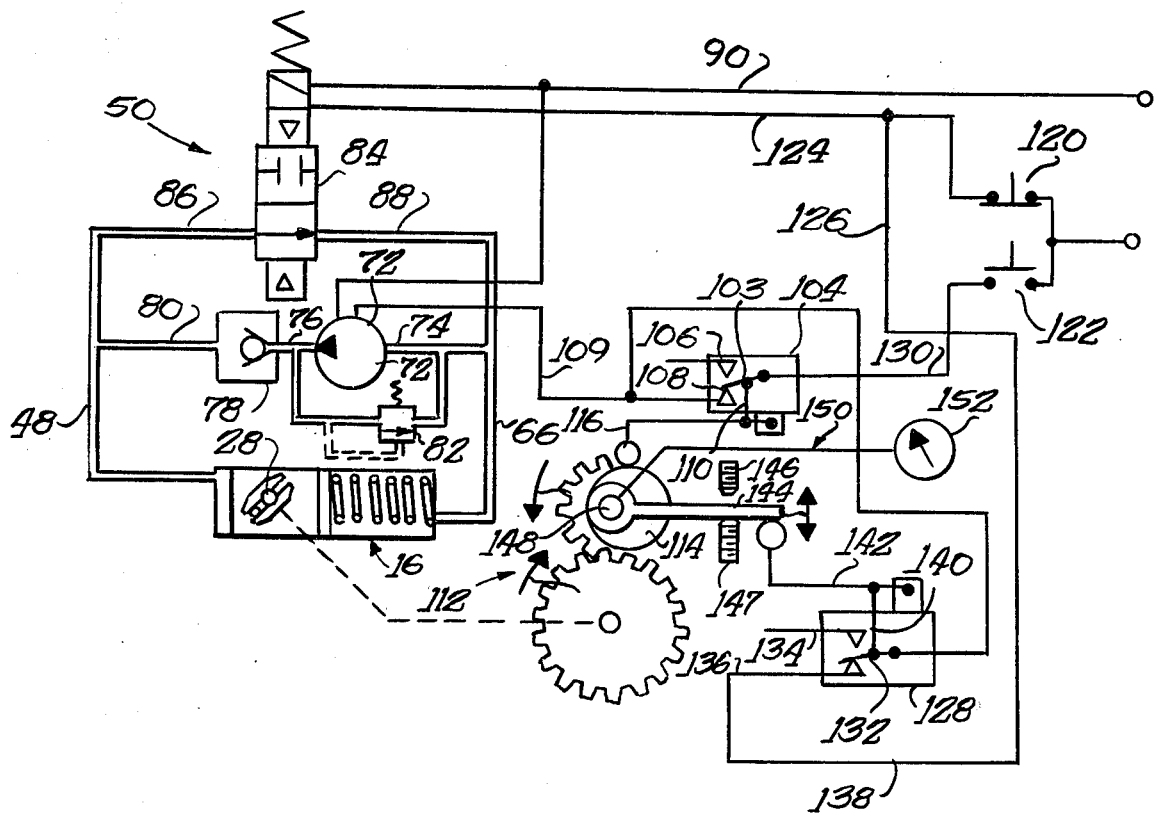
FIG. 4 is a diagrammatic representation of a second embodiment of a controlled valve actuator system in accordance with this invention.
Figure 5:
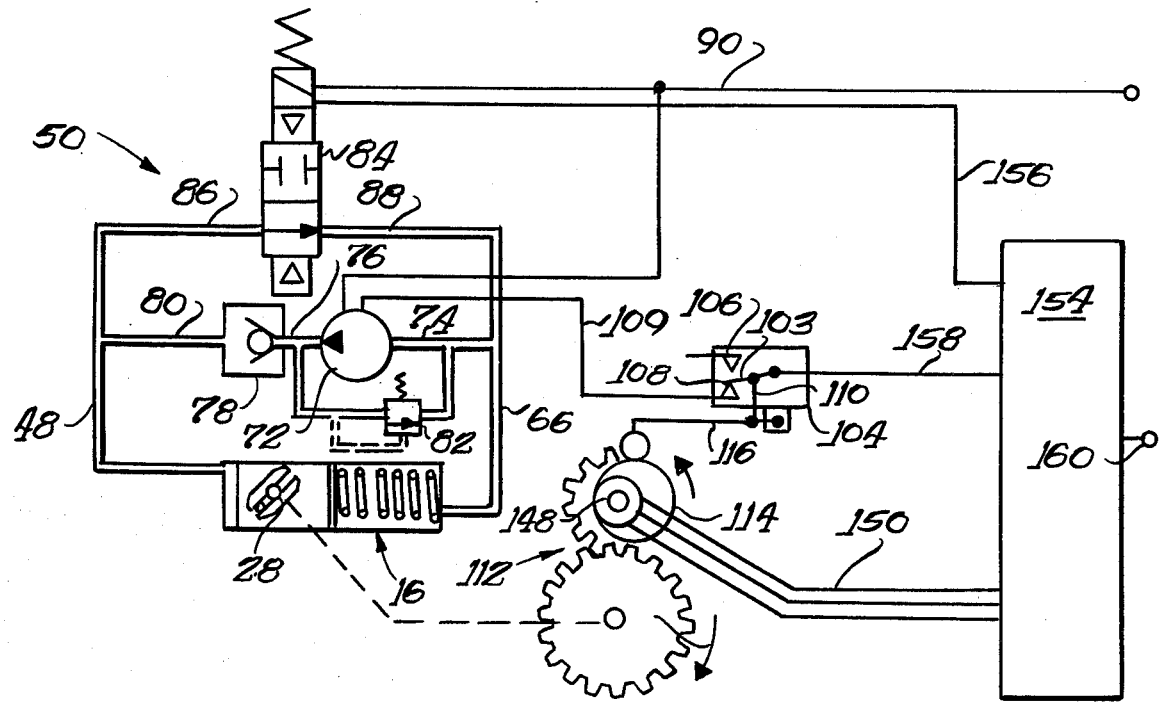
FIG. 5 is a diagrammatic representation of a third embodiment of a controlled valve actuator system according to this invention.

From the foregoing, it will be appreciated that the control portion 50 effectively determines the position of the shaft 28 and valve 12, in accordance with the flow of hydraulic fluid, as controlled thereby. In accordance with the invention, then, three embodiments of control portions 50 suitable for use with the actuator member 16, are illustrated in FIGS. 3 through 5, respectively.

Referring first to the embodiment of FIG. 3, the control portion 50 is illustrated in conjunction with an actuator member 16, of the type shown and described with reference to FIG. 2. For purposes of clarity, the actuator 16 illustrated in FIGS. 3 through 5 is shown in diagrammatic form, and includes only a single piston at one side thereof, it being understood that the operation of the control portion 50 to be described is identical with respect to each of the pistons 22, 24 of FIG. 2. As mentioned above, in some applications only a single piston may be provided.

Figure 3:
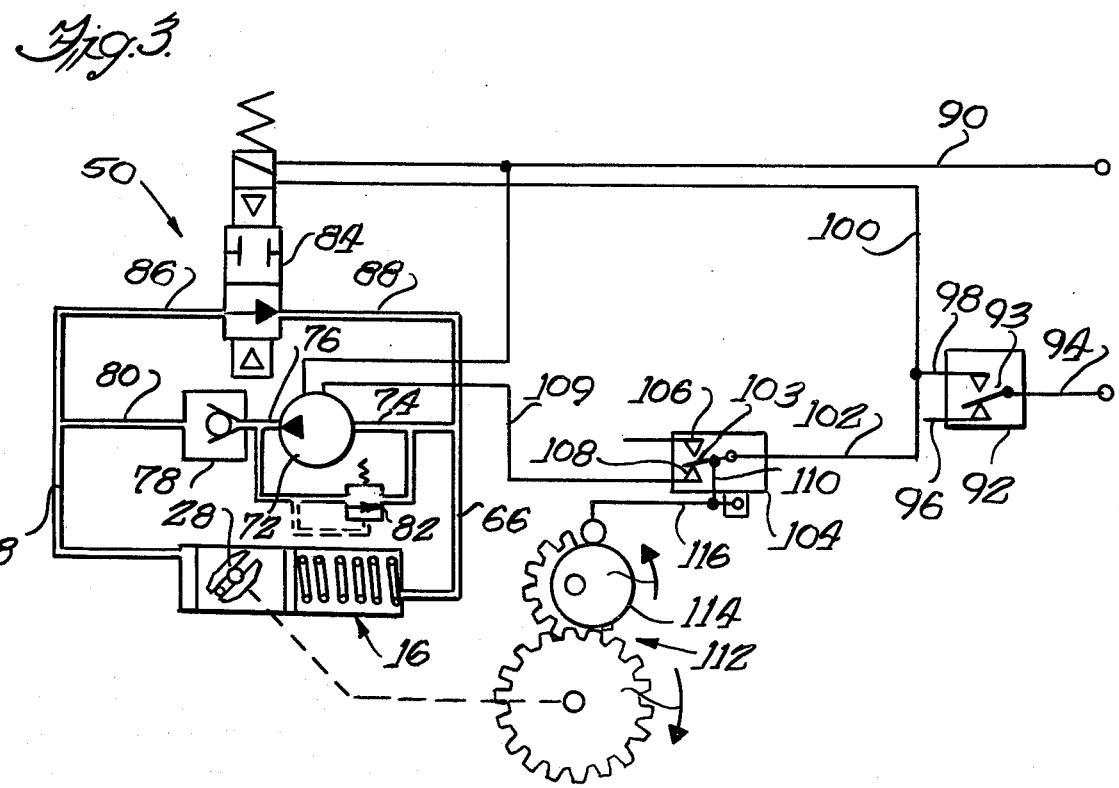
FIG. 3 is a diagrammatic representation of a first embodiment of a controlled valve actuator system in accordance with this invention.

The control portion 50 embodied in FIG. 3, may be characterized as a simple on/off or nonmodulating system. An electrically powered hydraulic pump 72 has a fluid inlet conduit 74 connected with the conduit 66, and a fluid outlet port 76 connected with the inlet of a one way check valve 78, for preventing return of hydraulic fluid through the pump 72. The outlet of the check valve 78 delivers fluid through a conduit 80 connected with the conduit 48. In accordance with conventional practice, a relief valve 82 is provided between the inlet 74 and outlet 76 of the pump 72. A normally open, electrically operated solenoid valve 84 has an inlet port joined by a conduit 86 to the conduit 48, and an outlet port joined by a conduit 88 to the conduit 66. By normally open it is meant that the valve 84 is open in the absence of electrical power to the solenoid and closes when the solenoid is electrically energized. Thus, the solenoid valve provides a hydraulic fluid return path between the conduits 48 and 66 for selectively by-passing the pump 72. Electrical power is supplied, for example, from a suitable AC power source. A line or conductor 90 has one end thereof joined with one side of the AC line, and the opposite end thereof joined with one side of the solenoid valve 84 and one side of the electric motor drive for the pump 72, respectively. The opposite side of the AC line is fed to a switch 92 by a conductor 94, the switch 92 being utilized as an on/off switch for the control portion 50. A switch contactor 93 of the switch 92 is movable between a first switch terminal 96 which is open circuited and a second switch terminal 98 which is joined via a line 100 to the opposite side of the solenoid valve 84, and via a line 102 to a movable contactor 103 of a second switch 104. The contactor 103 of the switch 104 is similarly movable between one pole 106 which is open-circuited, and an opposite pole 108 which is joined by a line 109 for delivering electric power to the opposite side of the electric motor drive for the pump 72. The switch 104, in this embodiment, may be characterized as a position limiting switch, the actuator 103 thereof being attached through a link 110 for actuation in response to the relative position of the valve shaft 28. The valve shaft 28 is rotatively joined to a speed increasing gear train designated generally 112, and illustrated diagrammatically in FIG. 3. A cam 114 is mounted for rotation by the speed increasing gear train 112, for actuating a lever 116, which in turn actuates the link 110 for operating the contactor 103 of the switch 104. While AC power circuits are described herein in connected with the illustrated embodiment, it will be understood that suitable DC power circuits may also readily be utilized.

In operation, with the contactor 93 of the switch 92 actuated into contact with the terminal 96 thereof no power is supplied to the control 50. Thus, the (normally open) solenoid valve 84 remains open, allowing the actuator to remain in its fail-safe position, due to the action of the springs as described above. When the switch 92 is actuated into contact with the terminal 98, power will be supplied to the solenoid valve 84 causing it to close. This then eliminates the return path between the conduits 48 and 66. At the same time, the cam 114 is arranged so that the contactor 103 of switch 104 will (with the valve in its fail-safe position) initially be in contact with the terminal 108, thereby supplying electric power to drive the pump 72. This operates the actuator 16, as described above, thus gradually turning the valve shaft 28 in the corresponding direction, away from its fail-safe position. As mentioned above, this direction of rotation may tend to either open or close the valve, depending on the orientation of the actuator 16 with respect to the shaft 28. In any case, the gear train 112 rotates in unison with the shaft 28, thus rotating the cam 114. The cam 114 is positioned fixedly with respect to the gear train so as to push the contactor 103 of the switch 104 into contact with the terminal 106 when the shaft 28 reaches the desired position, and consequently, the valve 12 is opened or closed thereby to the desired degree. This then removes power from the pump 72, maintaining the valve in the desired position. Advantageously, the cam 114 may be fixedly oriented with respect to the gear train 112 so as to actuate the switch 104 as described at any desired position of the valve between fully opened and fully closed.

In accordance with a feature of the invention, should any temporary failure occur in the system, as for example fluid leakage back through the check valve 78, such that the shaft 28 begins to return towards its failsafe position (as urged by the springs) the control 50 returns the valve to the position at which the switch 104 was initially actuated. More specifically, the speed increasing gear train 112 is preferably arranged so that rotation of the valve on the order of one quarter of a degree towards its fail-safe position will cause the cam 114 to be rotated sufficiently to again return the contactor 103 of the switch 104 into contact with the terminal 108 thereof. This will again turn on the pump 72 thereby rotating the shaft 28 back to the point at which the cam 114 again actuates the switch 104 to remove power from the pump 72. It will be appreciated that the cam 114, once set in a desired position, may be moved to a different position with respect to the gear train 112, for varying the position of the shaft 28 as controlled thereby. Upon total loss of hydraulic pressure, the fail-safe mechanism described above will return the valve to its fail-safe position. In the case of a loss of electrical power, the fail-safe mechanism will also operate, as a loss of power will again open the solenoid valve 84 allowing the spring to actuate the piston, returning the fluid through the conduits 48 and 86, the solenoid valve 84 and the conduits 88 and 66.

Referring now to FIG. 4, a second embodiment of a control portion 50 in accordance with this invention is illustrated in diagrammatic form. Many of the elements of the embodiment of FIG. 4 are substantially identical to those of the embodiment of FIG. 3 and bear identical reference numerals. Specifically, the actuator 16, conduits 48, 66, 86 and 88, the electric motor driven hydraulic pump 72 and check valve 78, the normally open electrically powered solenoid valve 84, and relief valve 82 are substantially identical in form and hydraulically interconnected in the same manner as described above in the embodiment of FIG. 3.

The gear train 112 is joined for rotation in unison with the valve shaft 28, and a cam 114 is fixed for rotation by the gear train 112, in substantially similar fashion as the like numbered elements of the embodiment of FIG. 3.

The electrical portion of the control 50 of the embodiment of FIG. 4 is somewhat different from that in the embodiment of FIG. 3. One side of a suitable AC power line is connected with one side of both the solenoid valve and the electric motor drive for the pump 72. The opposite side of the AC power line is connected to one terminal of each of a pair of pushbutton type switches 120, 122. The opposite terminal of the switch 120 is joined by a line 124 to the remaining side of the electrically actuated solenoid valve 84, and, by a line 126 to the contactor terminal of a switch 128, which may be characterized as a position maintaining switch. The opposite terminal of the pushbutton switch 122 is connected via a line 130 to the contactor 103 of the switch 104, substantially similar to switch 104 of FIG. 3. In similar fashion to the embodiment of FIG. 3, the cam 114 is positioned for actuating a lever 116 and link 110 for actuating the contactor 103. The terminal 106 of the switch 104 is open circuited and the terminal 108 thereof connected to the opposite side of the motor drive for the hydraulic pump 72.

Referring now to the switch 128, it will be seen that it is similar in its construction and mode of operation to the switch 104. Specifically, a contactor 132 is movable between an open circuited terminal 134 and a terminal 136. In similar fashion to the switch 104, the contactor 132 is joined to a linkage 140 which is in turn connected to a lever 142. A slip-clutch cam 144 is mounted on the gear train 112 for rotation with the cam 114 thereon. Thus, the slip-clutch cam 144 and the cam 114 are rotated simultaneously by the gear train 112 in response to rotation of the shaft 28. Advantageously, a pair of stops 146 and 147 are provided for defining the limits of movement of the slip-clutch cam 144.

For monitoring and providing a visual display corresponding to the position of the shaft 28, a potentiometer 148 is also mounted on the gear train 112 to be rotated in unison with the cams 114 and 144. Electrical connecting lines designated generally 150 are provided to a meter 152 which may be of conventional construction and operation e.g., including a suitable voltage supply, bridge circuit and ammeter, for producing an electric analog signal corresponding to shaft position displayed on a suitable scale. Preferably, the pushbutton control switches 120 and 122 are mounted in a common housing with the meter 152, to provide a convenient control station whereby an operator may simultaneously operate the valve actuator and observe the position of the valve shaft. One suitable device combining a meter and a pair of control switches is shown in bulletin E-262 "Posimeter Remote Indicator and Control of Actuator Travel," published by the Hills-McCanna Company. It will be understood that various other positional feedback devices may be used in place of potentiometer 148, and similarly, suitable alternative readout devices, eg., digital displays or the like, may be utilized in place of the meter 152, without departing from the present invention.

In operation, pushbutton switch 120 (FIG. 4) is normally closed, thereby supplying power to the solenoid operated valve 84 for closing the valve. The actuator may then be energized by closing the normally open pushbutton switch 122, which delivers electrical power through the switch 104 to the pump 72 for driving the actuator in the manner described hereinabove. The cam 114 in this embodiment is arranged to allow the switch 104 to remain actuated through the terminal 108 until the shaft 28 has been rotated a full 90° away from its fail-safe position, thus either fully opening or fully closing the valve, depending upon the orientation of the actuator 16 with respect thereto. The switch 122 may be maintained in its closed position until the meter 152 indicates that the shaft 28 has assumed the desired position, at which time the switch 122 is released, thereby stopping the pump 72. The slip-clutch cam 144 is rotated by the gear train 112 into contact with the stop 146, whereupon it continues to slip with respect to the gear train 112, tending to remain against the stop 146. Thus, the switch 128 is maintained in contact with the open circuited terminal 134 thereof.

If, due to some reduction in hydraulic pressure in the system, the actuator 16 allows the shaft 28 to return toward its fail-safe position, the speed increasing gear drive is arranged to rotate the cam 144 back into contact with the stop 147, thereby actuating the switch 128 and energizing the terminal 136 thereof. Thus, as the switch 120 remains closed, power is supplied via the switch 128 to the electric motor drive for the pump 72, to return the shaft 28 to the position initially set by actuation of the switch 122 described above. When this position is reached, the cam 144 allows the switch 128 to return to terminal 134, thus stopping the pump 72. Preferably, the speed increasing gear drive is arranged to so actuate the cam 144 in response to substantially one quarter of a degree of rotation of the shaft 28. It will be appreciated, then, that the foregoing arrangement is such that any desired position of the shaft 28 may be set by actuation of the switch 122 while observing the meter 152, and maintained by the action of the cam 144 as described. This is in contrast to the fixed cam arrangement of the cam 114 of the embodiment of FIG. 3.

It will further be noted that should it be desired to return the valve shaft 28 in the direction of its fail-safe position, actuation of the switch 120 removes electrical power from the solenoid valve 84, allowing the valve to open and to provide a return path for hydraulic fluid as described above. With the switch 120 open, it will be noted that power is also removed from the switch 128, thus preventing the cam 144 from actuating the pump 72. The cam 144 will then slip on its slip-clutch arrangement when it has engaged the stop 147, and thereby define a new position which may be observed on the meter 152, and in which the shaft 28 will be retained, once the switch 120 is again closed. The fail-safe feature of the actuator 16 comes into operation, in this embodiment, should electrical power be lost from the system. Upon loss of electrical power the solenoid valve 84 will again open, allowing the actuator to return to its fail-safe position.

In FIG. 5, a third embodiment of a control portion 50 in accordance with this invention is illustrated in diagrammatic form. It will be noted initially that the embodiment of FIG. 5 includes the actuator 16, fluid conduits 48, 66, 86 and 88, the electric motor driven hydraulic pump 72, the relief valve 82, the check valve 78, and the normally open electrically actuated solenoid valve 84 of the previous embodiments. The elements are hydraulically connected in the same fashion as described above for the previous embodiments. Also in the same fashion as for the previous embodiments, the speed increasing gear train 112 is driven by the shaft 28 and the cam 114 is positioned on the gear train 112 for actuating the limit switch 104 via the lever 116 and the linkage 110. The contactor 103 is movable as previously described between the open circuited terminal 106 and the terminal 108 connected with one side of the electric motor drive for the pump 72. The opposite side of the motor drive for the pump 72 and one side of the electrically actuated solenoid valve 84 are connected via the line 90 to one side of a suitable AC power line. In similar fashion to the embodiment of FIG. 4, the potentiometer 148 is joined for rotation by the gear train 112 simultaneously with the cam 114. In accordance with the embodiment of FIG. 5, the potentiometer is provided with suitable connecting lines 150 to an electronic control circuit 154. The electronic control circuit 154 has an output line 156 connected to the opposite power input terminal of the solenoid valve 84, a second output line 158 connected with the contactor 103 of the switch 104, and a power input terminal 160 connected with the opposite side of the AC line.

Figure 6:
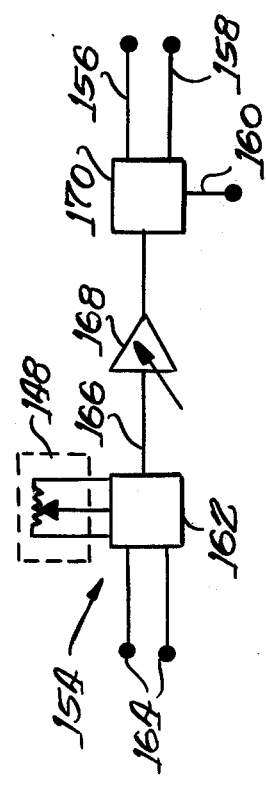
FIG. 6 is a schematic circuit diagram in block form of a portion of the embodiment of FIG. 5.

Attention is directed to FIG. 6, wherein the elements of the electronic control circuit 154 are schematically illustrated in block diagrammatic form. An input interface and comparator circuit 162 has a pair of input terminals 164 connected with a process controller and sensor to receive a feedback signal therefrom, indicative of the rate of fluid flow through the conduits 14, 14a, which fluid flow is regulated by the valve 12, as shown in FIG. 1. The process controller (not shown) includes, for example, a fluid flow sensor of conventional construction interposed in the conduit 14, 14a for providing a signal proportional to the flow rate therein, and a comparator circuit including an operator adjustable flow selector for setting in a signal corresponding to a desired rate of flow. A process signal output from the process controller then comprises the input signal at the terminals 164, and is indicative of a need to increase, decrease, or maintain a rate of flow as determined by the comparator. Alternatively, a process controller of the type described may be included in the electronic control circuit 154, electrically connected before the input interface and comparator 162, whereby the input lines 164 are connected to receive the signal from the flow sensor directly. The potentiometer 148 is interconnected with the comparator 162, whereby the signal at the potentiometer 148, corresponding to the valve shaft position, is compared with the signal from the process controller. Thus, an output 166 of the interface and comparator 162 provides a signal indicating that the valve shaft 28 is to be rotated in its fail-safe direction, opposite its fail-safe direction, or maintained in its present position. A bi-polar control amplifier 168 receives the signal at the output 166 and activates one of a pair of solid state switches, such as triacs, included in a dual static switch circuit 170. The triac switches 170 are adapted to switch electrical power between the input line 160 and either of the outputs 156 or 158, as required by the amplifier 168, as for alternatively de-energizing the solenoid valve 84 or energizing the electrical motor for driving the pump 72. Suitable electronic circuits for performing the functions described for the circuit 154 and components thereof are described in bulletin E-261A, "Modular Solid-State Servo Amplifier," and in product data sheet PDC 1, "Modular Solid-State Process Controller," dated March 1976, both published by the Hills-McCanna Company.

In operation, then, the embodiment of FIG. 5 provides for fully automatic operation of the actuator 16 for controlling the valve position 28 in accordance with a desired rate of flow through the conduits 14, 14a of FIG. 1. The cam 114 is preferably arranged to allow the switch 104 to remain in contact with the terminal 108 thereof until the valve shaft 28 is rotated fully in the direction opposite its fail-safe direction. The valve is thus either fully opened or fully closed, depending upon the orientation of the actuator 16 as discussed above, when the switch 104 is actuated by the cam 114 into contact with the open circuited terminal 106, thus removing power from the motor drive for the pump 72. It will be appreciated that this arrangement prevents the control circuit 154 from continuing to operate the pump 72 when the valve has been fully actuated.

Assuming, for example, that the fail-safe valve position in this case is fully closed, when the flow through the conduits 14, 14a is less than the desired flow rate set in, the circuit 154 provides power via one triac switch 170 to the line 158. The line 158 is then connected by the closed switch 104 (assuming the valve is not already fully opened) to the line 108, thus energizing the pump 72 for driving the actuator 16 to open the valve 12, until the desired flow rate is achieved. Conversely, if the flow rate is less than the set desired flow rate, one triac switch 170 (which normally is closed to deliver power to the line 156) will be opened, thus removing power from the solenoid valve 84. In the same fashion as described above, then, the solenoid valve 84 will be opened allowing fluid to flow freely between opposite sides of the piston of the actuator 16, thus allowing the valve 12 to return towards its fail-safe position, which in the present example results in closing the valve. The valve 12 will continue to close in this fashion until the desired flow rate is achieved, whereupon power will again be restored by the switch 170 to the solenoid valve 84, thus preventing the valve 12 from closing further. It will be appreciated, that if the actuator 16 is oriented with respect to the valve 12 such that the fail-safe position is the fully opened position, the operation of the above-described system is analogous. In either case, should electrical power be lost entirely, the solenoid valve 84 will open, allowing the actuator to return to its fail-safe position.

It will be appreciated from the foregoing description, that the embodiment shown and described with reference to FIGS. 5 and 6 is capable of rotating the valve 12, via the valve shaft 28, in either direction, as required to maintain a desired rate of flow. Thus, an operator need only actuate a control or selector switch to choose a desired rate of flow, which rate will be maintained by the system of FIG. 5. Moreover, should a change in the flow rate be desired, an operator may again actuate the selector for choosing the new desired flow rate, and the system of FIG. 5 will function as described to achieve and maintain this new desired flow rate.

While preferred embodiments have been illustrated and described herein, various changes and modifications may occur to those skilled in the art, and such changes are to be understood as forming a part of this invention insofar as they fall within the spirit and scope of the appended claims.

The invention is claimed as follows:

1. An electro-hydraulic controlled valve actuator system comprising: an actuator member including piston means mounted for reciprocation within a cylinder and means connecting said piston means for rotating a valve shaft, a hydraulic pump joined with said cylinder for selectively pumping hydraulic fluid in a selected direction between portions of said cylinder on opposite sides of said piston means to drive said piston means in a first direction, thereby rotating said valve shaft in a first corresponding direction, a valve connected for selectively by-passing said pump, resilient means yieldably biasing said piston means in a second direction opposite said first direction, whereby when said valve is open said hydraulic fluid flows therethrough allowing said resilient means to drive said piston means in said second direction to rotate said valve shaft in a second corresponding direction, and control means for selectively energizing said valve and said hydraulic pump for rotating said valve into and thereafter maintaining a preselected position.

2. The electro-hydraulic controlled valve actuator according to claim 1, wherein said valve comprises an electrical solenoid operated valve, said hydraulic pump is electrically driven, and said, control means comprises first switch means connected between a source of electric power and said solenoid valve, second switch means connected between said first switch means and said hydraulic pump, said solenoid valve being normally open, and said first switch means being manually actuatable to energize said solenoid valve to a closed position, and means operatively connected with said valve shaft including cam means for selectively actuating said second switch means between an open and closed position so as to selectively energize said hydraulic pump and thereby rotate said valve shaft to said preselected position.

3. The electro-hydraulic controlled valve actuator according to claim 2 wherein said cam means is adjusted for actuating said second switch to remove power from said hydraulic pump when said valve shaft is in said preselected position, in response to the position of said valve shaft, and for actuating said second switch means to energize said hydraulic pump for rotating said valve shaft to maintain said preselected position in response to a predetermined amount of rotation of said valve shaft away from said preselected position in said second direction.

4. The electro-hydraulic controlled valve actuator according to claim 3 wherein said means operatively connected with said valve shaft includes gear means arranged as a speed increasing gear drive for increasing the sensitivity of said cam means to said rotation of said valve shaft.

5. The valve actuator of claim 1 wherein said control means includes position feedback means operatively connected to the valve shaft for providing a signal corresponding to the position of said valve shaft.

6. The electro-hydraulic controlled valve actuator according to claim 5 wherein said valve comprises an electrical solenoid operated valve and said hydraulic pump is electrically driven, and said control means further comprises first switch means for selectively energizing said solenoid valve, second switch means for selectively energizing said hydraulic pump, a limit switch interposed between said second switch means and said hydraulic pump, a position maintaining switch interposed between said first switch means and said hydraulic pump, and means operatively connected with said valve shaft including cam means for actuating said limit switch for de-energizing said pump when said valve is rotated fully in said first direction, said last mentioned means further including second cam means also operatively connected with said valve shaft and rotatable in unison with said first cam means for actuating said position maintaining switch for energizing said hydraulic pump when said shaft rotates away from said preselected position in said second direction.

7. The electro-hydraulic controlled valve actuator of claim 6, wherein said position feedback means comprises a potentiometer means having a wiper arm mounted for rotation in unison with said first and second cam means, and further including circuit means including meter means connected with said potentiometer means for providing an analog indication corresponding to the position of said shaft.

8. The electro-hydraulic controlled valve actuator according to claim 5 wherein said valve means comprises an electrical solenoid operated valve and said hydraulic pump is electrically driven, said position feedback means comprises a potentiometer having a wiper arm operatively connected with said valve shaft for rotation thereby, and wherein said control means further comprises electronic circuit means connected with said potentiometer for producing a shaft position signal corresponding to the position of said shaft, and means for producing a desired shaft position signal corresponding to a desired flow rate, means for comparing the shaft position signal with the desired shaft position signal and for selectively energizing said solenoid or said hydraulic pump to cause said actuator to rotate said shaft to a position corresponding to said desired shaft position signal, in accordance with said desired flow rate.

9. The valve actuator according to claim 8 further including a limit switch connected between said electronic circuit means and said hydraulic pump, and means operatively connected with said shaft including cam means for actuating said limit switch to de-energize said pump in response to full rotation of said shaft in said first direction.

10. A hydraulic valve actuator comprising a generally cylindrical housing defining a piston cylinder, piston means mounted for reciprocation within said piston cylinder, compressible resilient means yieldable biasing said piston means in one direction, means in said cylinder for receiving a valve shaft rotatively mounted on a first side of said piston means, yoke means connecting said piston means for rotating said valve shaft in response to said reciprocation of said piston means, said reciprocating piston means defining a variable volume hydraulic fluid reservoir in said cylinder, said cylinder further having a pair of ports for connection with conduit means for selectively delivering hydraulic fluid between opposite sides of said piston means for effecting, together with said resilient means, said reciprocation of said piston means.

11. A hydraulic valve actuator according to claim 10 wherein said compressible resilient means is disposed in said cylinder for yieldably biasing said piston means in a direction towards said valve shaft for rotating said shaft in a corresponding direction, in the absence of sufficient hydraulic fluid under pressure opposing said resilient means.

12. An electro-hydraulic controlled valve actuator comprising: an actuator member including a cylinder, piston means mounted for reciprocation within said cylinder, and means responsive to said piston means for selectively rotating a valve shaft, a hydraulic pump joined with said cylinder for selectively pumping hydraulic fluid for reciprocating said piston means in said cylinder in a first direction to rotate said valve shaft in a first corresponding direction, and a valve for selectively joining conduit means connected with said cylinder at opposite sides of said piston means, compressible resilient means yieldably biasing said piston means in a second direction opposite said first direction to rotate said valve shaft in a second corresponding direction in the absence of sufficient opposing hydraulic pressure supplied by said pump, and control means for selectively energizing said valve or said hydraulic pump for rotating said valve shaft as required to achieve and maintain a desired flow rate through the valve.

* * * * *